United States Patent Office 3,543,577
Patented Dec. 1, 1970

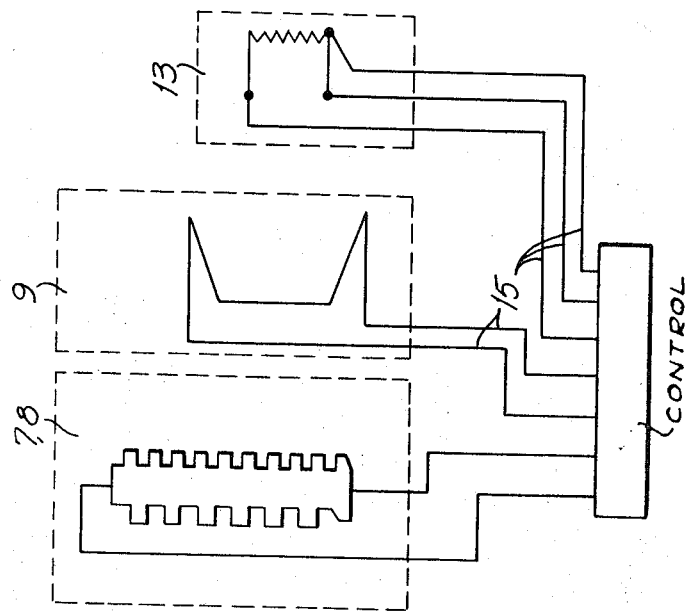
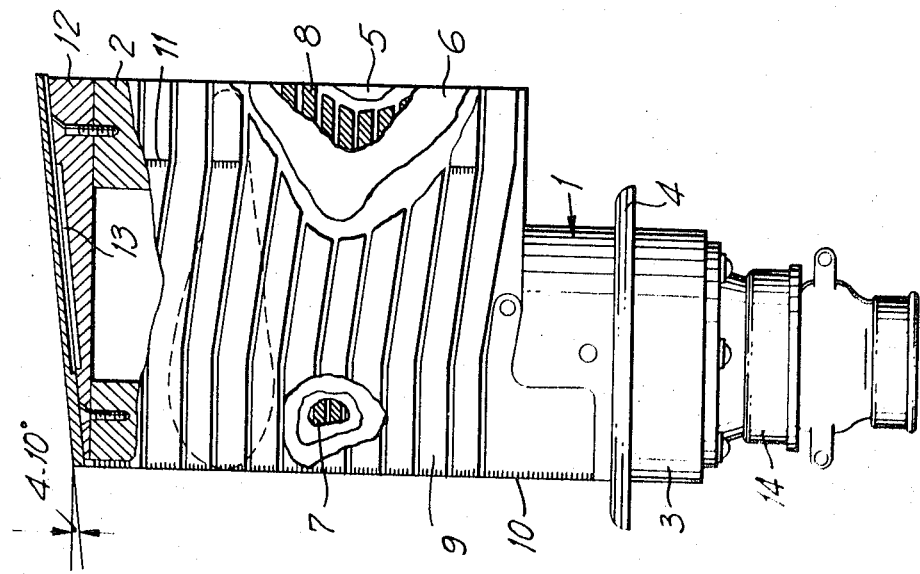

3,543,577
DEVICE FOR MONITORING THE ICING INTENSITY OF A BODY IN AIR STREAM
Vladimir Vasilievich Pavlov, Usacheva 29, korpus 7, kv. 418; Valery Alexandrovich Ivliev, Simonovsky val 26, korpus 2, kv. 18; Jury Petrovich Zlobin, I Mikhalkovsky pereulok 25, kv. 17; Oleg Ernstovich Birnbaum, Krasnoarmeiskaya ulitsa 13/15, kv. 121; and Oleg Konstantinovich Trunov, Bulvar Yana Rainisa 11, kv. 36, all of Moscow, U.S.S.R.
Filed Aug. 12, 1968, Ser. No. 751,781
Int. Cl. G01w 1/08, 1/14
U.S. Cl. 73—170    3 Claims

ABSTRACT OF THE DISCLOSURE

A device for measuring icing intensity of a body in an air stream comprises a casing in the form of a symmetrical airfoil on which is mounted a temperature difference transducer, which provides output signals indicative of the icing intensity on the body and which is constituted by a band thermocouple pile with hot and cold junctions disposed on the casing and connected in series to form a band which constitutes an outer covering for the casing. Electrical heating elements are disposed in the casing and are connected to an impact temperature transducer, which is mounted on the inner surface of an end wall cover of the casing.

---

This invention relates to devices for monitoring the commencement and termination of icing, as well as for measuring the magnitude or extent of icing hereafter termed "icing intensity" and for measuring cloud water.

More particularly, this invention relates to devices for measuring the icing intensity of a body in an air stream, which body consists of a casing shaped as a symmetrical airfoil, a leading and trailing casing edge temperature difference transducer mounted on said casing, an impact temperature transducer, and heating elements controlled by said impact transducer.

Known are devices for the measurement of icing intensity, such as the instruments developed by Teddington Aircraft Controls Ltd., wherein the electric output signal varies with the impact temperature and the temperature difference of the heated surfaces, cloud water droplets being precipitated on one of said surfaces.

The prior art icing intensity meters do not provide for an adequate accuracy of measurements under diverse in-flight conditions and under changing meteorology conditions. The known icing intensity meters suffer from a number of limitations, among which mention should be made of disadvantages inherent in the disposition of a thermocouple under an insulating layer. Due to this arrangement, the cold junctions sense the temperature effect of precipitating water droplets only after an appropriate change in the temperature of the insulating layer, thereby increasing the response time of the meter and decreasing instrument sensitivity.

The thermocouple hot junctions are disposed in an air duct provided for the purpose, in which duct heat removal is essentially different from that occurring at the leading edge of the airfoil, the dissimilarity of heat removal conditions being responsible for measuring errors as a function of in-flight conditions.

The thermo-switch of the heating elements is actuated by a signal dependent upon the humid stream temperature, so that the effect of cloud water on the temperature of the surface being iced is not taken into account.

Accordingly, it is an object of the present invention to provide a device for measuring the intensity of icing characterized by its shorter response time and higher sensitivity.

It is another object of the present invention to provide a device for measuring the intensity of icing that will not give erroneous indications and will be operable in a wide range of in-flight and meterological conditions.

It is a further object of the present invention to provide a device for measuring the intensity of icing which is dependable in operation at impact temperatures in the vicinity of 0° C.

These and other objects are accomplished by the provision of an icing intensity meter, which comprises, according to the invention, a temperature difference transducer made in the form of a band thermocouple pile whose hot and cold junctions are series connected to form a continuous band that constitutes the outer covering of the meter casing, an impact temperature transducer being disposed on the internal surface of an end cover of the meter casing. Hot junctions of the band thermocouples of the temperature difference transducer are disposed on the lateral surfaces at the rear of the casing in the laminar flow region in such a manner that the hot junctions of adjacent thermocouples are arranged on the opposite sides of the airfoil model. The end cover which carries the impact temperature transducer, forms an angle of 4 to 10 deg. in relation to the plane which is at right angles to the leading edge axis.

The present invention is illustrated hereinbelow by the description of an exemplary embodiment thereof and by the accompanying drawings, wherein:

FIG. 1 shows the icing intensity meter, according to the invention, partly broken away and in section, and FIG. 2 is a circuit diagram of the icing intensity meter.

The device comprises a casing 1 (FIG. 1), whose upper part 2 is made in the form of a symmetrical airfoil, while the bottom part 3 of the casing is cylindrical in shape. Interposed between the upper and the bottom part of the casing is flange 4, which serves for mounting the device. In upper part 2, provision is made for two cemented insulating layers 5 and 6 with heating elements 7 and 8 interposed between said layers at the leading and the trailing edge of the airfoil model, respectively. Placed on top of insulating layer 6 is a temperature difference transducer 9 made in the form of a band thermocouple pile, the thermocouple bands constituting the outer covering of the airfoil. Cold junctions 10 of the thermocouple pile are arranged at the axis of the leading edge of the airfoil, whereas hot junctions 11 are located laterally at some distance from the axis of symmetry of the tailing edge of the airfoil in the laminar flow region, an added requirement being that the hot junctions of adjacent thermocouples be disposed at the opposite sides of the air foil.

The top end of casing 1 carries cover 12 with impact temperature transducer 13 affixed to the inner surface thereof. The outer surface of cover 12 forms an angle of 4 to 10 deg. in relation to the plane which is at right angles to the axis of the leading edge of the airfoil.

The bottom cylindrical part of casing 1 is furnished with connectors 14, whose contacts are coupled, via leads 15, with heating elements 7 and 8 (FIG. 2), temperature difference transducer 9, and impact temperature transducer 13.

The icing intensity meter, according to the invention, functions in the following manner.

During meter operation, transducer 13 sends a signal corresponding to the impact temperature of the outer surface of top cover 12. When the impact temperature equals 0° C., as indicated by transducer 13, heating elements 7 and 8 will be energized as long as the impact temperature remains in the subzero range. While heating elements 7 and 8 are being energized, the outcoming signal of temperature difference transducer 9 is recorded.

In case water droplets appear in the free air stream, water droplet precipitation on the leading edge of the airfoil causes the leading edge to cool markedly, whereby a significant temperature difference set up between the junctions 10 and 11, the temperature difference thus produced being responsible for an E.M.F. of the thermocouple pile which is essentially greater than that obtained when the free air stream contains no water droplets. If water droplets cease to settle out on the leading edge, the steady value of the E.M.F. characteristic of the "dry" free air stream conditions will be restored. Hence, an E.M.F. value in excess of the steady E.M.F. value is indicative of the commencement of icing, variations in the rate of water droplet precipitation on the leading edge of the airfoil causing the generation of an E.M.F. proportional to the rate of water droplet precipitation and, hence, to the instant icing intensity.

We claim:
1. A device for measuring icing intensity of a body in an air stream, which device comprises a casing in the form of a symmetrical airfoil; a temperature difference transducer for providing output signals which are a measure of the icing intensity on the body, said transducer comprising a band thermocouple pile with hot and cold junctions disposed on said casing and connected in series to form a band which constitutes an outer covering for said casing, said casing including an end wall; an impact temperature transducer disposed on said end wall on the inner surface thereof for producing an electrical signal in response to the sensed temperature; and electric heating elements disposed in said casing and connected to and controlled by said impact temperature transducer.

2. A device according to claim 1 wherein the cold junctions are at the leading edge of the casing and the hot junctions of the band thermocouples of the temperature difference transducer are disposed on the lateral surfaces at the rear of the casing in the laminar flow region, the hot junctions of adjacent thermocouples being arranged on opposite sides of the airfoil.

3. A device according to claim 1 wherein the said end wall forms an angle of 4 to 10 degrees in relation to a plane which is at right angles to the leading edge.

References Cited
UNITED STATES PATENTS

| | | | |
|---|---|---|---|
| 2,642,737 | 6/1953 | Kinsella | 73—341 |
| 2,766,619 | 10/1956 | Tribus | 73—170 |
| 3,057,198 | 10/1962 | Crouchman | 340—234 |

LOUIS R. PRINCE, Primary Examiner

D. E. CORR, Assistant Examiner